Aug. 30, 1960  E. DRESNER  2,950,563
BELLOWS DUSTER
Filed Aug. 18, 1959  2 Sheets-Sheet 1
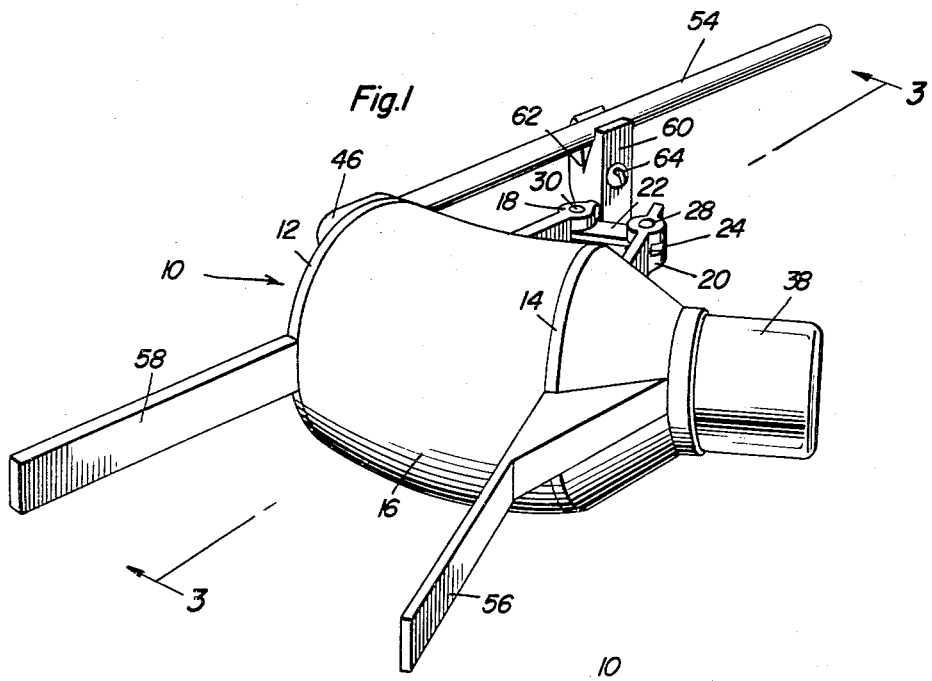
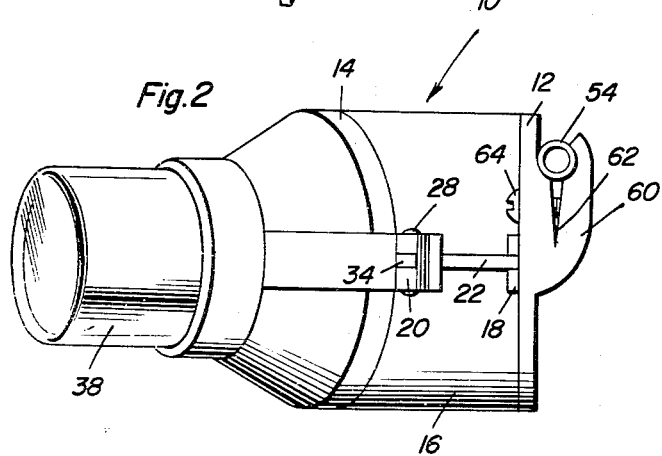
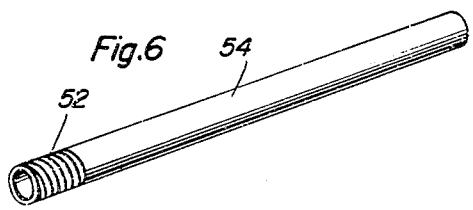
Edgar Dresner
INVENTOR.

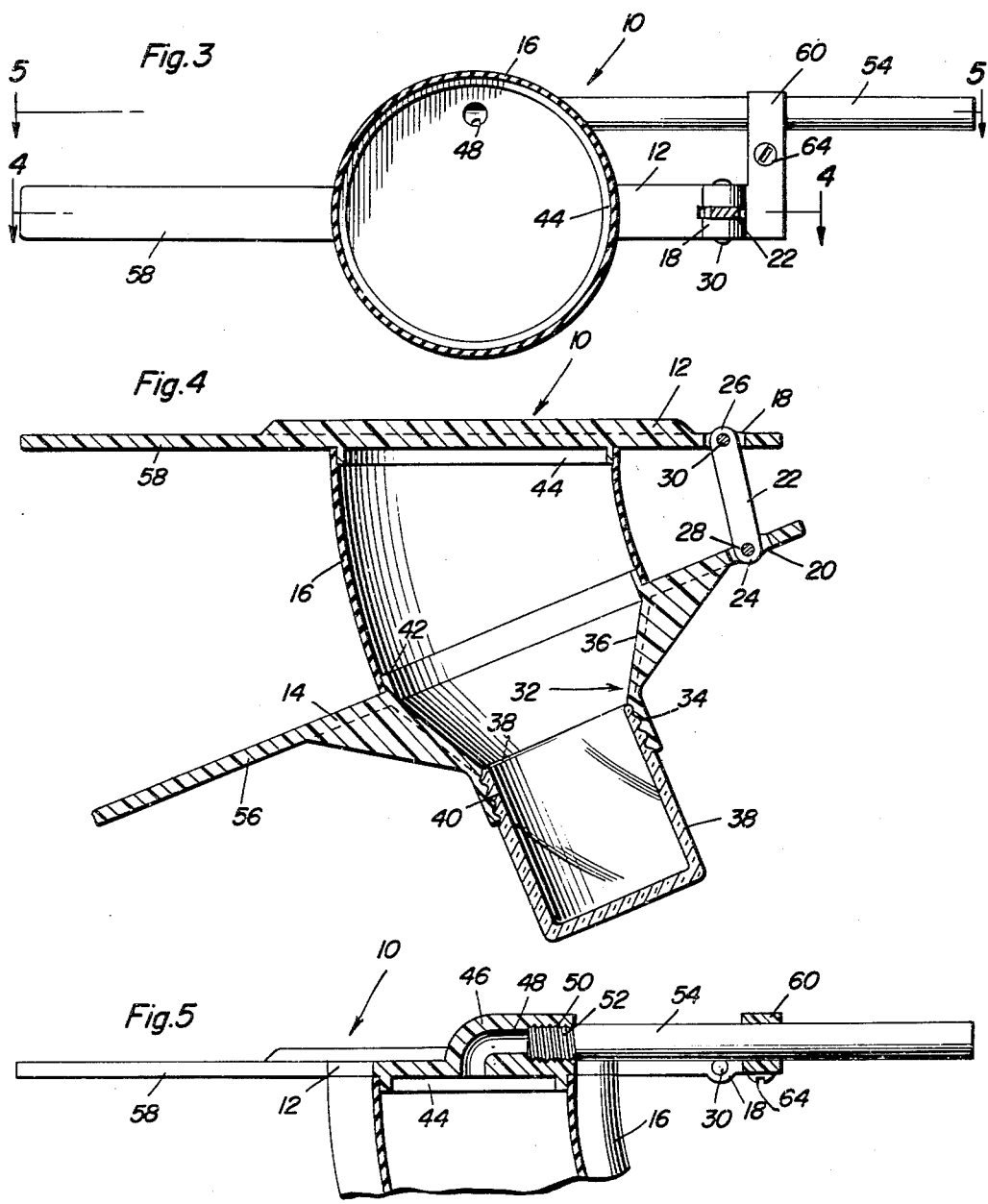

United States Patent Office 2,950,563
Patented Aug. 30, 1960

2,950,563
BELLOWS DUSTER
Edgar Dresner, 257 Valentine Lane, Yonkers 5, N.Y.
Filed Aug. 18, 1959, Ser. No. 834,585
9 Claims. (Cl. 43—146)

This invention relates to a bellows duster adapted for dispensing insecticide and the like and more particularly relates to a bellows duster having an insecticide reservoir removably secured thereto whereby the duster can be readily used for dispensing various forms of insecticide and the like successively by merely replacing the reservoir containing one type of insecticide with a reservoir containing another type of insecticide.

Heretofore, bellows dusters have been designed for the purpose of dispensing insecticide and the like but have not had easily replaceable insecticide reservoirs which in themselves form part of the bellows chamber and may be readily replaced. The conventional form of bellows dusters are provided with insecticide reservoirs contained within the bellows with a filler opening in one of the side walls of the duster in communication with the interior of the bellows for the purpose of replenishing the supply of insecticide contained within the bellows or for substituting therefor a different type of insecticide.

It is therefore the main object of this invention to provide a bellows duster having a removable reservoir which may be readily removed and refilled or replaced with another reservoir containing a different type of insecticide so that the bellows duster may be quickly used with various crops requiring different types of insecticides.

A further object, in accordance with the preceding object, is to provide an opening in one of the side walls of the bellows duster in which the removable insecticide reservoir is secured having outwardly convergent side walls whereby insecticide remaining within the bellows duster may be funneled into the reservoir secured thereto before the latter is removed in order to insure that substantially all of the insecticide contained within the duster will be removed prior to the securement of another reservoir to the duster containing a different type of insecticides.

A still further object, in accordance with the preceding objects is to provide a bellows secured between the opposed surface of the side walls of the bellows duster which is substantially circular in cross-section with the funnel-shaped opening being substantially equal in area to and concentric with the adjacent end of the bellows.

Yet another object of this invention is to provide a bellows duster having two side walls hingedly connected to each other at one end by means of a link having its ends pivotally secured to the ends of the side walls in order to insure that the two side walls thereof will be maintained in spaced relation at one end by the connecting link.

Another object is to provide a duster which may be inclined upwardly or downwardly from a horizontal position at least 45° without effecting a change in the operation of the duster.

Still another object is to provide a bellows duster having an outlet tube removably secured thereto whereby outlet tubes of varying length or shape may be readily secured to the duster.

A final object to be specifically enumerated herein is to provide a bellows duster that will lend itself to conventional forms of manufacture and be easy to use so as to provide a duster that will be economically feasible and also readily usable by all persons desiring a small, compact and portable duster.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the bellows duster comprising the present invention;

Figure 2 is an end elevational view of the duster as seen from the right end of the duster in Figure 1;

Figure 3 is a longitudinal vertical sectional view taken substantially upon the plane indicated by the section line 3—3 of Figure 1;

Figure 4 is a horizontal longitudinal sectional view taken substantially upon the plane indicated by the section line 4—4 of Figure 3;

Figure 5 is a horizontal longitudinal sectional view taken substantially upon the plane indicated by the section line 5—5 of Figure 3 showing the details of construction between one of the side walls of the duster and the outlet tube removably secured thereto, parts of the bellows being broken away; and Figure 6 is a perspective view of one form of an outlet tube through which the bellows dispenses insecticide and the like.

Referring now more specifically to the drawings the numeral 10 generally designates the bellows of the instant invention which comprises a pair of opposed side walls 12 and 14 having a bellows 16 secured between the opposing surfaces thereof. The forward ends of the side walls 12 and 14 are bifurcated as at 18 and 20 and have secured therebetween a connecting link 22 which has its opposite ends 24 and 26 pivotally secured to the furcations of side walls 12 and 14 by means of pivot pins 24 and 26 respectively.

The side wall 14 has formed therein an elongated opening generally referred to by the reference numeral 32 having an outer internally threaded cylindrical portion 34 and an inner funnel-shaped portion 36 having outwardly convergent side walls. The insecticide reservoir 38 is cylindrical in shape and has an externally threaded neck portion 40 which is threadedly engaged in the outer cylindrical portion 34. It will be noted from Figure 4 of the drawings that the outer extremity of the funnel-shaped inner portion 36 terminates substantially at the opening 39 formed in the upper portion of the insecticide reservoir 38.

Formed about the inner extremity of the funnel-shape portion 36 is an upstanding cylindrical flange 42 which projects laterally from the surface of the side wall 14 adjacent the bellows 16. The opposing surface of the side wall 12 is likewise provided with an upstanding circular flange 44 which projects towards the opposite side wall 14. The bellows 16 is substantially circular in cross-section, which can more readily be seen by Figure 3, and the opposite ends thereof are disposed about and are in frictional engagement with the flanges 42 and 44. It is to be understood that the opposite ends of the bellows 16 may be secured to the flanges 42 and 44 by any convenient means such as by cementing. Further, if it is desired, circular clamps of any type could be utilized to retain the opposite ends of the bellows 16 disposed in overlying relation to the circular flanges 42 and 44.

The side wall 12 has secured thereto an outlet fitting 46 having a bore 48 formed therein which is in communication at one end with the interior of the bellows 16 and is provided with a threaded opening 50 at the outer end. An outlet tube 54 is removably secured in threaded opening 50 by means of threaded portion 52. It is to be understood that the end of the outlet tube 54 remote from the threaded portion 52 may be adapted to have removably secured thereto various forms of outlet nozzles.

Each of the side walls 14 and 16 comprise a substantially circular intermediate section with elongated arm portions extending therefrom in opposite directions. One pair of the extending arm portions has the connecting link 22 pivotally secured therebetween and the other pair of arm portions 56 and 58 comprise handles which may be grasped in order to effect the collapsing and expanding of the bellows 16.

Secured to the side wall 12 adjacent the connecting link 22 is a support 60 which may be conveniently constructed of a resilient material and bifurcated as at 62 with a threaded fastener 64 secured between the furcations so as to yieldably retain therein and support therebetween the outlet tube 54.

In operation, the reservoir 38 containing the desired insecticide may be removably secured within the threaded portion 34 whereupon the bellows duster 10 may be operated in an obvious manner to dispense the insecticide therefrom. If it is desired to change the insecticide contained within the duster 10 before the supply therein is exhausted, the duster 10 may be positioned with the reservoir 38 in a depending position with the bellows in the extended position whereupon the duster may be lightly vibrated by a tapping motion or the like to return substantially all of the insecticide within the duster into the reservoir 38. When this has been accomplished, the reservoir 38 may be removed and a suitable closure (not shown) secured over the opening thereof and a new reservoir (not shown) containing a supply of different insecticide removably secured to the duster 10 in the same manner as was reservoir 38.

It is to be understood that the amount of dust dispensed by the duster may be determined by both the position and the size of the outlet opening as well as the pressure which is effected within the duster. Although the preferred form of the invention is that in which both the size and location of the outlet opening is fixed, the side wall 12 could be provided with a center portion (not shown) having the outlet opening formed therein which could be replaced with other center portions having formed therein outlet openings of varying sizes and in different locations to vary the amount of dust dispensed at a given pressure.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A bellows duster for dispensing insecticide and the like comprising two side walls opposing each other, means hingedly connecting said side walls at one end for movement towards and away from each other, a handle formed on the opposite ends of said side walls, a bellows secured between the opposing surfaces of said side walls, an outlet tube secured to one of said side walls and in communication with the interior of said bellows, and an insecticide reservoir removably secured to one of said side walls in communication with the interior of said bellows.

2. The combination of claim 1 wherein the other side wall has a threaded opening formed therein, said reservoir having a threaded neck portion threadedly engaged in said opening.

3. The combination of claim 1 wherein the other side wall has a funnel-like depression having outwardly convergent side walls terminating in an opening formed therein, said reservoir removably secured in said opening.

4. The combination of claim 3 wherein said bellows is cylindrical in cross-section.

5. The combination of claim 4 wherein the inner end of said depression adjacent said bellows forms the inner extremity of said opening and is substantially equal in area and concentric with the adjacent end of said bellows.

6. The combination of claim 1 wherein said connecting means includes a connecting link pivotally secured at each end to one of said one ends of said side walls.

7. The combination of claim 6 wherein said bellows are spaced from said link and wherein said link is of sufficient length to space said side walls at the adjacent surface of said bellows, a sufficient distance apart to enable the complete collapsing of the bellows while the side walls are in spaced, parallel relation.

8. The combination of claim 1 including an upstanding circular flange formed on the confronting surfaces of said side walls, said bellows being circular in cross-section and having the opposite ends thereof disposed about and frictionally engaging said flanges.

9. The combination of claim 1 wherein the other side wall has a funnel-like depression having outwardly convergent side walls terminating in an opening formed therein, said reservoir being removably secured in said opening, said connecting means includes a connecting link pivotally secured at each end to one of said one ends of said side walls.

References Cited in the file of this patent

UNITED STATES PATENTS

| | | |
|---|---|---|
| 132,116 | Stewart | Oct. 8, 1872 |
| 573,184 | Hoffman | Dec. 15, 1896 |